US007002642B2

(12) United States Patent  
Jung (10) Patent No.: US 7,002,642 B2  
(45) Date of Patent: Feb. 21, 2006

(54) AUTOSTEREOSCOPIC DISPLAY APPARATUS AND METHOD OF MANUFACTURING THE SAME

(75) Inventor: Jin-Hee Jung, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 5 days.

(21) Appl. No.: 10/885,062

(22) Filed: Jul. 7, 2004

(65) Prior Publication Data

US 2004/0239835 A1    Dec. 2, 2004

Related U.S. Application Data

(62) Division of application No. 10/026,481, filed on Dec. 27, 2001, now Pat. No. 6,816,207.

(30) Foreign Application Priority Data

Apr. 27, 2001  (KR) .............................. 2001-22846

(51) Int. Cl.  
*G02F 1/1335* (2006.01)  
*G02F 1/1337* (2006.01)

(52) U.S. Cl. ..................... 349/15; 349/191; 349/183

(58) Field of Classification Search .................. 349/25, 349/183, 191  
See application file for complete search history.

(56) References Cited

U.S. PATENT DOCUMENTS

| 5,264,964 | A  |   | 11/1993 | Faris ........................... 359/465 |
| 5,327,285 | A  |   | 7/1994  | Faris ........................... 359/483 |
| 5,894,361 | A  | * | 4/1999  | Yamazaki et al. ............. 349/15 |
| 5,917,562 | A  | * | 6/1999  | Woodgate et al. ............. 349/15 |
| 6,046,849 | A  |   | 4/2000  | Moseley et al. ............. 359/465 |
| 6,055,103 | A  | * | 4/2000  | Woodgate et al. ........... 359/494 |
| 6,084,647 | A  | * | 7/2000  | Hatano et al. ................. 349/15 |
| 6,128,059 | A  | * | 10/2000 | Nishiguchi ................. 349/129 |
| 6,320,629 | B1 | * | 11/2001 | Hatano et al. ................. 349/15 |

OTHER PUBLICATIONS

Witte et al. "Modification of the twist angle in chiral nematic polymer films by photoIsomerization of the chiral dopant." *Journal of Applied Physics*. vol. 85, No. 11, pp. 7517-7521.

* cited by examiner

*Primary Examiner*—Kenneth Parker  
(74) *Attorney, Agent, or Firm*—McKenna Long & Aldridge LLP (57) ABSTRACT

The present invention provides a three-dimension display apparatus which includes a liquid crystal display; a first polarizer on the rear surface of the liquid crystal display; a second polarizer on the front surface of the liquid crystal display; a liquid crystal polymer being on the second polarizer and including a chiral dopant and liquid crystal molecules. The liquid crystal polymer is divided into first regions through which incident light is not polarized and second regions through which the incident light is polarized at 90 degrees. A third polarizer on the liquid crystal polymer selectively transmits the incident light from the liquid crystal polymer. A light source below the first polarizer.

3 Claims, 7 Drawing Sheets

AUTOSTEREOSCOPIC DISPLAY APPARATUS AND METHOD OF MANUFACTURING THE SAME

This application is a divisional of prior application Ser. No. 10/026,481, filed Dec. 27, 2001 now U.S. Pat. No. 6,816,207.

This application claims the benefit of Korean Patent Application No. 2001-22846, filed on Apr. 27, 2001, which is hereby incorporated by reference as if fully set forth herein.

BACKGROUND OF THE INVENTION

1. Field of the Invention

The present invention relates to liquid crystal display devices. More particularly, it relates to an apparatus and method of making three-dimensional (3-D) displays that are capable of viewing a 3-D image.

2. Discussion of the Related Art

In normal vision human eyes perceive views of the world from two different perspectives due to their spatial separation. The spatial separation between typical eyes is about 65 mm. In order to assess the distance between objects, the brain integrates the two perspectives obtained from each eye. In order to provide a display, which is effective in displaying 3-Dimages, it is necessary to recreate this situation to the observer. That is, supplying a so-called "stereoscopic pair" of images to the observer's eyes.

Most 3-D displays may be classified into two types: stereoscopic and autostereoscopic. Stereoscopic displays typically display both of the images over a wide viewing area. The views are encoded by color, polarization state and time of the display. A filter system of glasses worn by the observer separates the views, thereby each eye sees only the view that is intended for it. That is the right and left eyes have different views.

Autostereoscopic displays present a spatial image to the viewer without the use of glasses, goggles or other viewing ads. Instead, the two views are only visible from defined regions of space.

A "viewing region" is a term described as the region of space in which an image is visible across the whole of the display active area. If the observer is situated such that one eye is in one viewing region and the other eye is in the other viewing region, then a correct set of views is seen and a 3D image is perceived by the observer.

In autostereoscopic displays of the "flat panel" type the viewing regions are formed by a combination of the picture element structures (pixels) and optical elements, generically termed a parallax optic. An example of such an optic element is a parallax barrier. This element is a screen with vertical transmissive slits separated by opaque barrier regions.

As a method of displaying the 3-D images without using viewing aids the lenticular method and a parallax barrier method have been conventionally proposed. The lenticular method and the parallax barrier method are stereoscopic image display apparatuses that do not require the use of polarization glasses, shutter glasses, goggles or other viewing ads. In these apparatuses, special optical elements such as lenticular lenses or parallax barriers are generally placed on the front surface sides of display devices. These special optical elements are relatively inexpensive and exhibit high productivity. A simple autostereoscopic image display apparatus can be easily formed by a combination of such an optical elements with a 2D display. Accordingly, these methods are especially suited for use with liquid crystal display devices (LCDs) and the like.

The parallax barrier method is a method in which a parallax barrier comprising an opaque material is slotted with a series of regularly spaced vertical slits and is arranged short of a display screen to cause parallax and to obtain the 3-D images. In the conventional parallax barrier method, a retardation film made of a polymer, a first polarizer and a second polarizer are utilized. Specifically, the retardation film includes a plurality of first regions and a plurality of second regions, these regions are utilized for carrying out an image-splitter method.

Figure 1A:
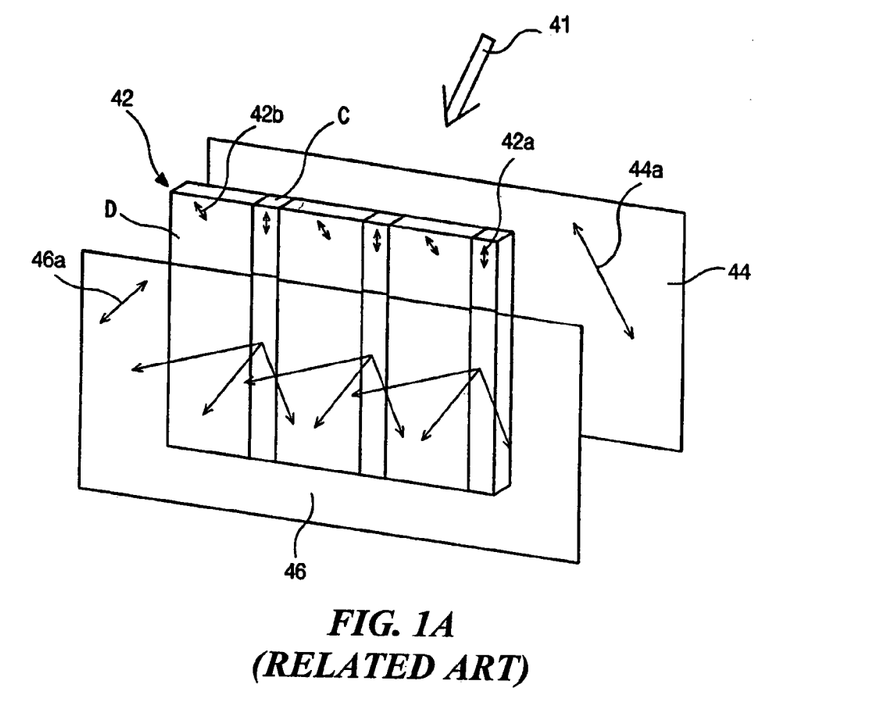
FIG. 1A is a global view of a parallax barrier constituted according to a related art.
Figure 1B:
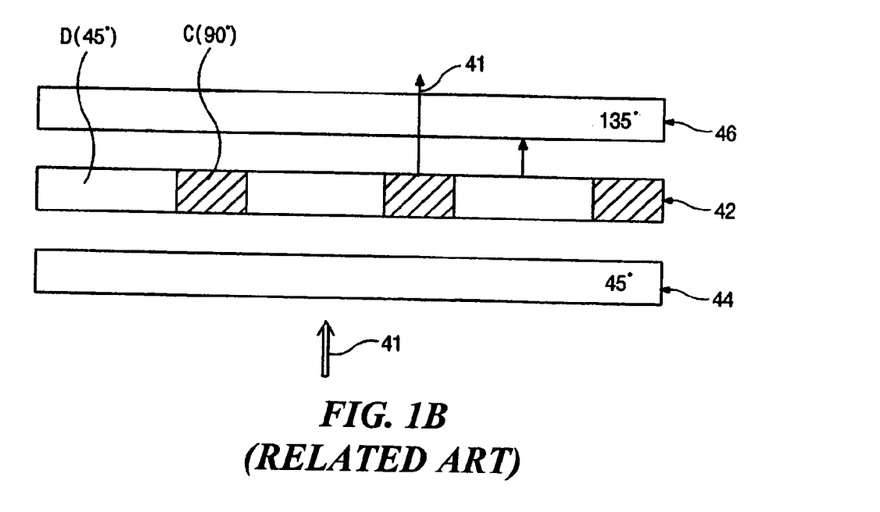
FIG. 1B is a cross-sectional view of the parallax barrier of FIG. 1A.

FIG. 1A is a global view of a parallax barrier according to a related art, and FIG. 1B is a cross-sectional view of the parallax barrier of FIG. 1A.

The parallax barrier shown in FIGS. 1A and 1B includes a polarization modifying layer 42 and polarizers 44 and 46 in the form of polarizing sheets. The polarization modifying layer 42 includes a patterned retarder layer, which is made by the methods illustrated in FIGS. 2A to 2E. Also, the polarization modifying layer 42 comprises first regions "C" in the form of parallel elongated slit regions. Specifically, these regions are arranged in such a manner to rotate linear polarization of incoming light 41. The first regions "C" are separated by second regions "D" which are arranged not to affect the polarization of the incoming light 41.

The first polarizer 44, which may include the output polarizer of an associated LCD, has a polarizing axis 44a. This axis is oriented at 45 degrees. This is typical of LCD output polarizers, such as the twisted nematic type polarizer. The optic axes of 42a in the first regions "C" are oriented at 90 degrees, and the optic axes 42b of the second regions "D" are aligned at 45 degrees so as to be parallel to the polarization vector of light emitted from the first polarizer 44. The second polarizer 46 has its polarizing axis 46a oriented at 45 degrees. The polarizing axis 46a of the second polarizer 46 is orthogonal to the polarizing axis 44a of the first polarizer 44.

In FIGS. 1A and 1B, when the incident light 41 passes through the first polarizer 44, it is polarized at +45 degrees relative to the vertical axis of the polarization modifying layer 42. The polarization modifying layer 42 has strip-shaped first regions "C" and strip-shaped second regions "D". The polarization of the light passing through the second regions "D" are not affected, therefore, the second polarizer 46 extinguishes light. This happens because the second polarizer 46 has a polarizing direction indicated at 46a, which is substantially orthogonal to the polarization direction of the light passing through the second regions "D". After the incident light 41 passes through the first polarizer 44, the polarization of the light passing through the first regions "C" are rotated by 90 degrees and as a result, this light passes through the second polarizer 46. Accordingly, the aforementioned device functions as a parallax barrier.

The polarization modifying layer 40 is made by forming a layer of reactive mesogen, such as RM257, available from MERCK® UK. Utilizing standard photolithographic techniques the layer is then patterned.

FIGS. 2A to 2E are cross-sectional views illustrating the steps of making the polarization modifying layer 40 of FIG. 1A.

Figure 2A:
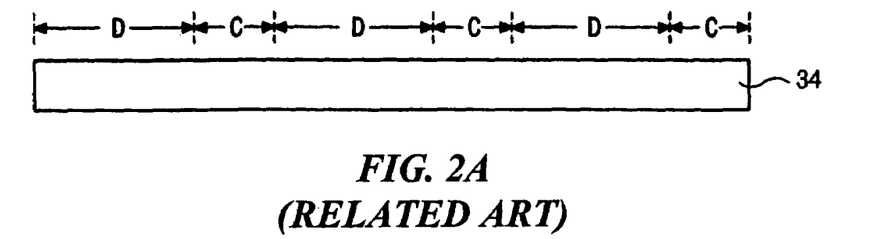
FIGS. 2A to 2E are cross-sectional views illustrating the steps of making the polarization modifying layer of FIG. 1A.
Figure 2B:
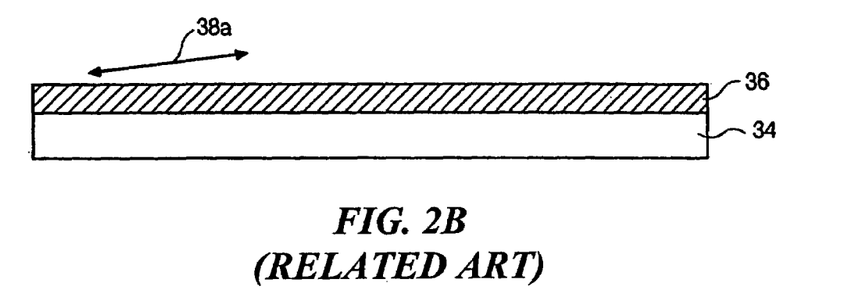

In FIG. 2A, a substrate 34 is divided into two regions, a plurality of first regions "C" and a plurality of second regions "D." Thereafter, an alignment layer 36 is formed on the substrate 34 as shown in FIG. 2B. The alignment layer 36 comprises rubbed polyimide, polyamide, or silicon oxide, which has a first rubbing direction 38a.

Figure 2C:
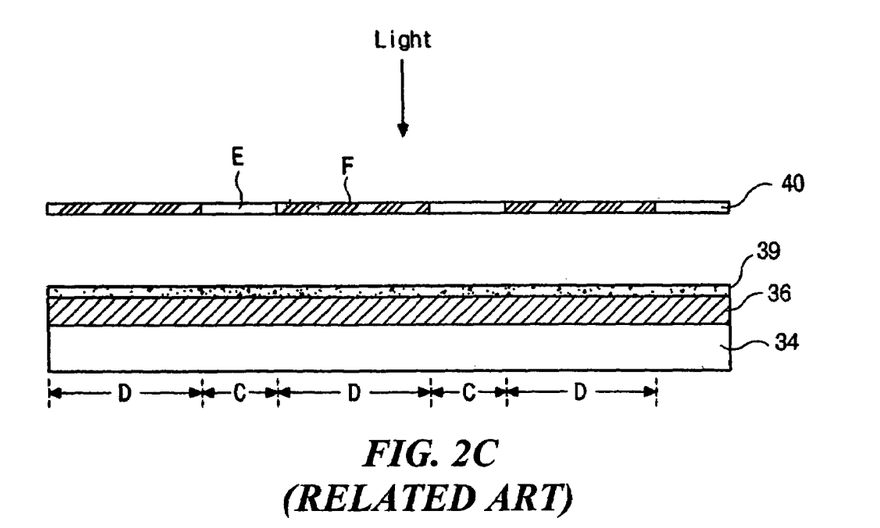
Figure 2D:
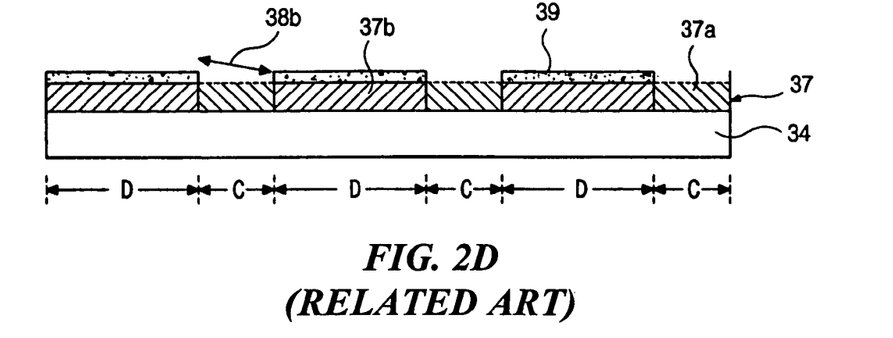

In FIG. 2C, a photo resist 39 is applied to the alignment layer 36 having the first rubbing direction. A mask 40 that has light-transmitting portions "E" and light-shielding portions "F" selectively exposes the photo resist 39. This exposure is accomplished by using known photolithographic techniques. Each of the light-transmitting portions correspond to each of the first regions "C" of the substrate 34, and each of the light-shielding portions correspond to each second regions "D" of the substrate 34. Then the exposed portions of the photo resist 39 associated with the light-transmitting portions "E" are removed, thereby exposing the first regions "C" of the underlying alignment layer 36 as shown in FIG. 2D. Then, the substrate 34 having the alignment layer 36 and photo resist 39 are thermal-heated in a heating apparatus. The substrate assembly is then rubbed in a second rubbing direction 38b in order to produce an alignment layer 37 having a spatially varying alignment direction. As a result, first alignment portions 37a corresponds to each of the first regions "C" having a second rubbing direction 38b, while the second alignment portions 37b corresponds to each of the second region "D" and have the first rubbing direction 38a.

Figure 2E:
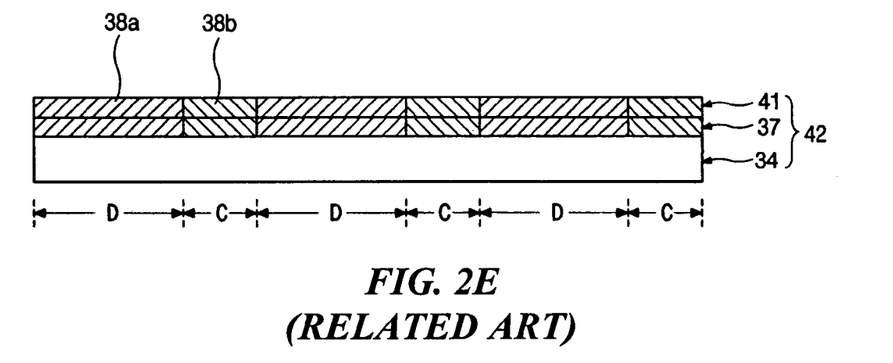

In FIG. 2E, the residual photo resist 39 of FIG. 2D is then completely removed. A retarder layer 41 is then formed on the alignment layer 37 having first and second alignment portions 37a and 37b. The retarder layer 41 is formed by way of depositing reactive mesogen, such as RM257. The retarder layer 41 adopts the alternate directions imposed by the underlying elements of the alignment layer 37. Namely, the retarder layer 41 has a first direction 38a in the portion corresponding to the second regions "D" and a second direction 38b in the portion corresponding to the first regions "C".

Alternatively, polyvinyl alcohol (PVA) can be adopted in the above-mentioned slit structure (i.e., the first region "C" of FIG. 1). That is, the polarization modifying layer 42 can be fabricated using the PVA, where a first film causing a first polarization is formed on a first substrate and a second film causing a second polarization state is then formed on a second substrate. Thereafter, the first and second substrates are combined to fabricate the polarization modifying layer and then the parallax barrier. However, this is quite disadvantageous because of the complexity in fabricating the polarization films and the associated increase in the manufacturing costs.

Furthermore, the above method of forming parallel elongated slit regions in the parallax barrier also has disadvantages. As a result of the complexity in the method of manufacturing, the manufacturing yield decreases and the manufacturing cost increases, thereby making this process disadvantageous.

SUMMARY OF THE INVENTION

Accordingly, the present invention is directed to an autostereoscopic display apparatus device that substantially obviates one or more of the problems due to limitations and disadvantages of the related art.

An advantage of the present invention is to provide an autostereoscopic display device having a stable 3-D image display.

Another advantage of the present invention is to provide a method of forming an autostereoscopic display device that includes a parallax barrier with chiral dopant and liquid crystals.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, provides a three-dimension (3-D) display apparatus, includes a liquid crystal display; a first polarizer on the rear surface of the liquid crystal display; a second polarizer on the front surface of the liquid crystal display; a liquid crystal polymer being on the second polarizer and including a chiral dopant and liquid crystal molecules, wherein the liquid crystal polymer is divided into first regions through which incident light is not polarized and second regions through which the incident light is polarized at 90 degrees, a third polarizer being on the liquid crystal polymer and selectively transmitting the incident light from the liquid crystal polymer; and a light source below the first polarizer.

In another aspect of the present invention, a method of fabricating a three-dimension (3-D) display apparatus includes the steps of providing a liquid crystal display; forming a first polarizer on the rear surface of the liquid crystal display; forming a second polarizer on the front surface of the liquid crystal display; forming a liquid crystal polymer on the second polarizer, wherein the liquid crystal polymer includes a chiral dopant and liquid crystal molecules, and is divided into first regions through which incident light is not polarized and second regions through which the incident light is polarized at 90 degrees; forming a third polarizer on the liquid crystal polymer; and arranging a light source below the first polarizer.

In the above-mentioned apparatus and method, the liquid crystal display includes a first substrate, a second substrate on which pixels and switching elements are formed, and a liquid crystal layer between the first and second substrates. The liquid crystal molecules in the first regions are arranged parallel lo an optic axis of the second polarizer whereas the liquid crystal molecules in the second regions are twisted at 90 degrees at the axis of the second polarizer. The third polarizer transmits the light from the first regions or from the second regions. Beneficially, the liquid crystal display can show two-dimension images. Additionally, the liquid crystal polymer has both e-mode and o-mode.

In another aspect of the present invention, a method of forming a liquid crystal polymer for use in a parallax barrier and a beam-splitter includes the steps forming liquid crystals including chiral dopant on a substrate; dividing the substrate into first regions and second regions; aligning a mask having light-transmitting portions that corresponds to the first regions and light-shielding portions that corresponds to the second portions; light-exposing the liquid crystals including the chiral dopant so as to make the first regions have a first optic axis and to make the second regions have a second optic axis; and forming a polarizer on the liquid crystals. The first optic axis is parallel to a polarizing axis of the polarizer whereas the second optic axis is at 90 degrees to the polarizing axis of the polarizer.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a farther understanding of the invention and are incorporated in and constitute a part of this specification, illustrate an embodiment of the present invention and together with the description serve to explain the principles of the invention.

In the drawings.

DETAILED DESCRIPTION OF THE ILLUSTRATED EMBODIMENTS

Reference will now be made in detail to an illustrated embodiment of the present invention, an example of which is shown in the accompanying drawings. Wherever possible, the similar reference numbers will be used throughout the drawings to refer to the same or the parts.

According to the present invention, a parallax barrier of autostereoscopic 3-D display adopts a retarder film including liquid crystals with chiral dopants to attain image splitting.

Figure 3:
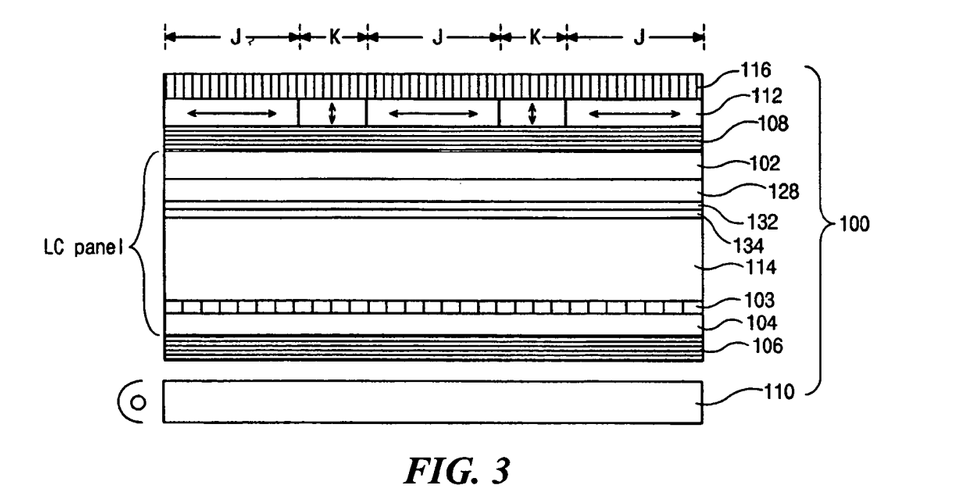
FIG. 3 is a cross-sectional view of autostereoscopic 3-D display according to the present invention.

FIG. 3 is a cross-sectional view of an autostereoscopic 3-D display according to the present invention. The autostereoscopic display 100 includes a liquid crystal panel (LC Panel), a liquid crystal polymer 112, a backlight device 110 and polarizers 106, 108 and 116. The first polarizer 106 and second polarizer 108 are respectively disposed on both sides of the LC panel. The liquid crystal polymer 112 is divided into first regions "J" and second regions "K" and arranged on the second polarizer 108. The third polarizer 116 is on the liquid crystal polymer 112.

The LC panel includes an upper substrate 102 on which a color filter layer 128, a passivation layer 132 and a transparent electrode 134 are formed, and a lower substrate 104 on which pixels 103 are formed with pixel electrodes (not shown), and switching elements (not shown) in an array matrix type configuration, and a liquid crystal layer 114 disposed between the upper and lower substrates 102 and 104, respectively. The liquid crystal polymer 112 has different polarization vectors and optic axes depending on the different regions "J" and "K."

The optical characteristics of the liquid crystal polymer 112 are accomplished by way of arrangement of the liquid crystals therein. The liquid crystal polymer 112 is made of a synthetic polymer material comprising a liquid crystal polymeric solution and a small amount of chiral dopant that has helical twisting power. Namely, the liquid crystal polymer 112 includes a chiral dopant having twisted characteristics. Due to the helical twisting power of the chiral dopant, the synthetic polymer material also has the twisted characteristics. When using a dopant having chirality and utilizing photo-irradiation the concentration of the dopant is primarily adjusted to make the liquid crystal polymer twisted at 90 degrees.

Namely, the twist angle of the liquid crystal display polymer is controlled by a photochemical mechanism of the chiral dopant. For example, if the liquid crystal polymer having a primary twist angle 90 degrees is exposed to photo-irradiation (e.g., ultraviolet rays), the pitch length of the liquid crystal polymer is shortened by less than 90 degrees depending upon the photo-irradiation. This chirality of the liquid crystal polymer is disclosed in "Journal of Applied Physics", Vo. 85, No 11, pp 7517–7521 (Jun. 1, 1999), which is hereby incorporated by reference.

As described above, when the liquid crystal polymer is twisted in accordance with the chiral dopant, the polarization of the light passing through the liquid crystal polymer changes. Using these optical characteristics, the pitch of the chirality can be adjusted differently between the first regions "J" and the second regions "K" of the liquid crystal polymer 112. Thus, the liquid crystal polymer 112 of FIG. 3 can be divided into the first regions "J" and the second regions "K" that have the different polarizations. Furthermore, when the third polarizer 116 is formed on the liquid crystal polymer 112, an autostereoscopic 3-D display with a parallax barrier such like that shown in FIG. 1 is accomplished.

Alternatively, polarized eye glasses worn by the observer can be utilized instead of the third polarizer 116. The 2-D images displayed in the LC panel are converted into the 3-D images with the polarized eye glasses. Without the use of the third polarizer 116 or the polarized eye glasses, 2-D images are displayed.

Figure 4A:
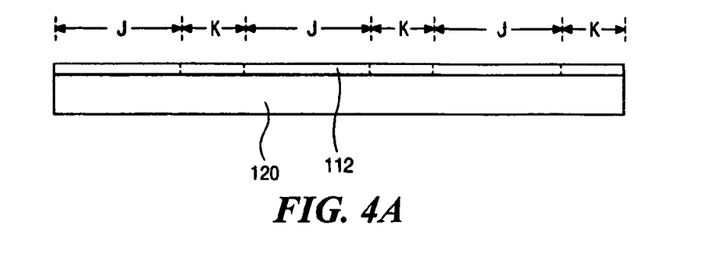
FIGS. 4A to 4D are cross-sectional views illustrating the steps of making the liquid crystal polymer of the parallax barrier according to the present invention.

FIGS. 4A to 4D are cross-sectional views illustrating the method of making a liquid crystal polymer of the parallax barrier according to the present invention. In FIG. 4A, a liquid crystal polymer 112 that includes a chiral dopant is formed on a substrate 120 using a spin coating method. Although not shown in FIG. 4A, a rubbed alignment layer is disposed between the substrate 120 and the liquid crystal polymer 112. According to the present invention, the liquid crystal polymer 112 is divided into first regions "J" and second region "K." At this point, the widths of the first and second regions "J" and "K" are defined depending on the resolution of the desired display. Generally, the widths range from several lens to several hundreds micrometers in the form of parallel elongated strips.

Figure 4B:
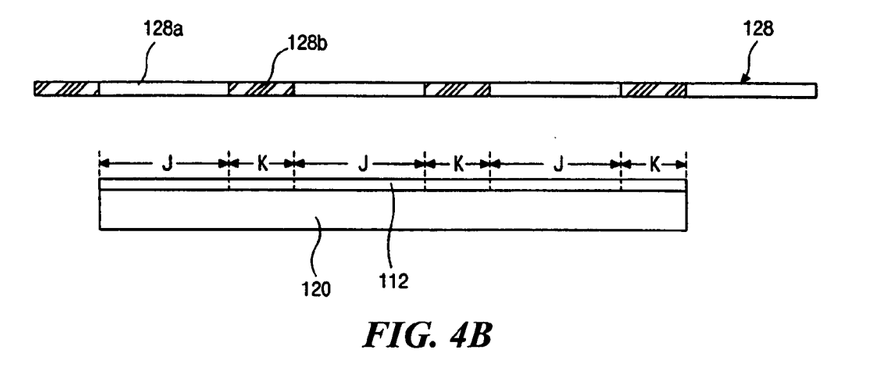

In FIG. 4B, a mask 128 is aligned over the liquid crystal polymer 112. The mask has light-transmitting portions 128a and light-shielding portions 128b. Each light-transmitting portion 128a corresponds to each first region "J" of the liquid crystal polymer 112 whereas each light-shielding portion 128b corresponds to each second region "K" of the liquid crystal polymer 112. After a light exposure process, the liquid crystal molecules in the first regions "J" of the liquid crystal polymer 112 are twisted in a first direction. In addition, the liquid crystal molecules in the second regions "K" of the liquid crystal polymer 112 are twisted in a second direction.

Figure 4C:
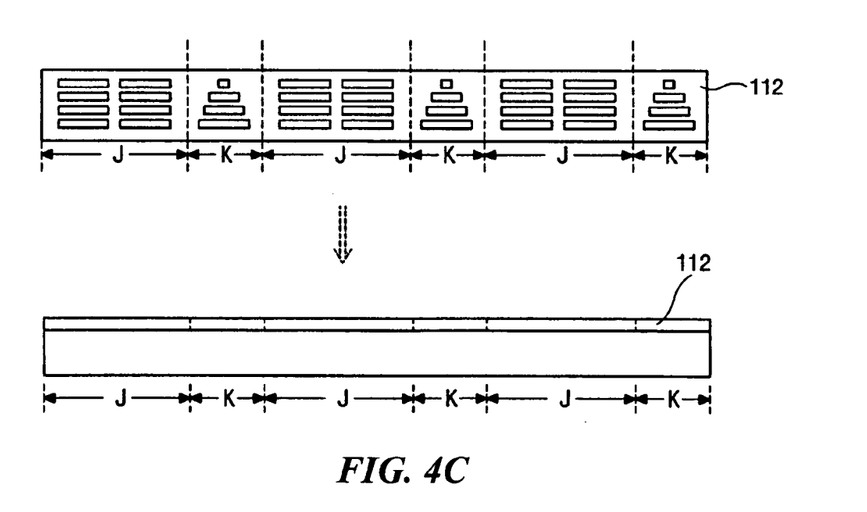

As shown in FIG. 4C, the liquid crystal molecules in the first region "J" are arranged horizontally, while the liquid crystal molecules in the second region "K" of the liquid crystal polymer 112 are twisted at 90 degrees.

Figure 4D:
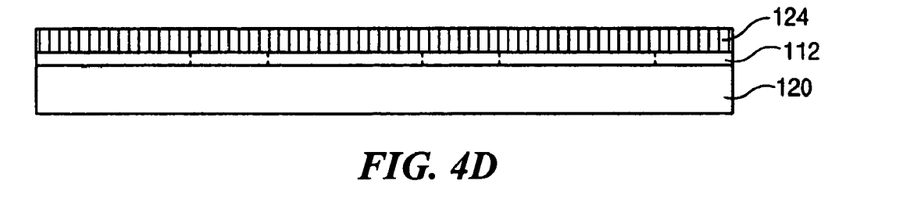

In FIG. 4D, after forming the liquid crystal polymer 112 including a plurality of "J" and "K" regions, a linear polarizer 124 is applied to the liquid crystal polymer 112. The linear polarizer 124 can be made of the polyvinyl alcohol (PVA) as mentioned above. In the above-mentioned structure, the upper substrate 102 of FIG. 3 can be utilized in the substrate 120 of FIG. 4D.

FIGS. 5A, 5B, 6A and 6B are cross-sectional views illustrating a parallax barrier of FIG. 3 according to the present invention.

Figure 5A:
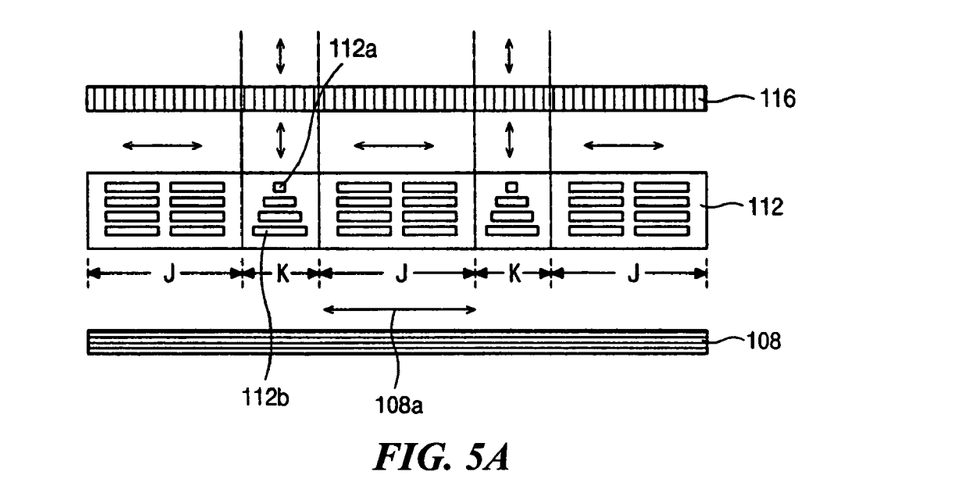
FIGS. 5 and 6 are cross-sectional views illustrating a parallax barrier of FIG. 3 according to the present invention.
Figure 5B:
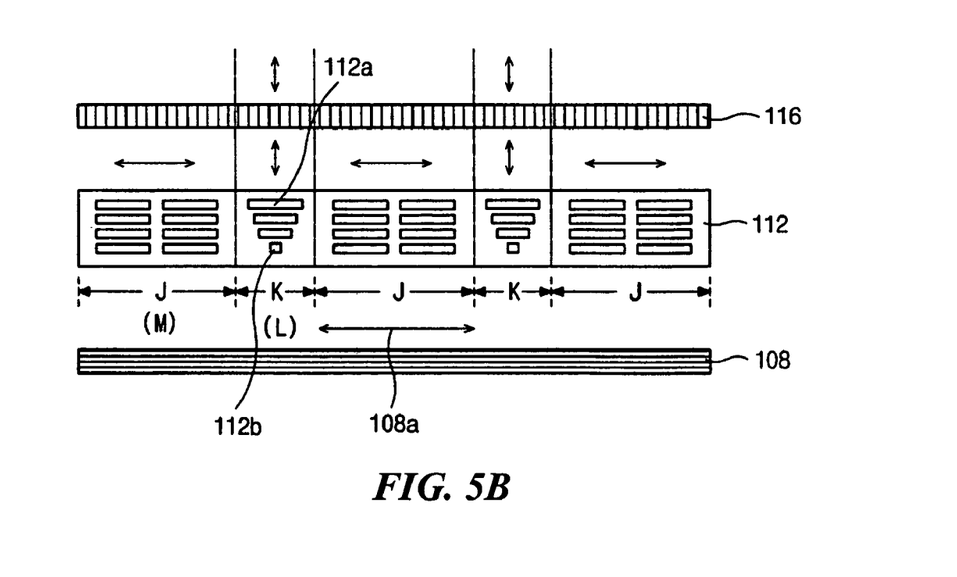

Referring to FIGS. 5A and 5B, the liquid crystal molecules in the first regions "J" are horizontally arranged parallel to each other, while the liquid crystal molecules in the second regions "K" are twisted at 90 degrees. In the second regions "K", the liquid crystal molecule 112a, at the top, makes a 90 degree angle with the liquid crystal molecules 112b at the bottom. The lower polarizer 108 is disposed on the rear surface of the liquid crystal polymer 112, while the upper polarizer 116 is disposed on the front surface of the liquid crystal polymer 112. The polarizing axis of the lower polarizer 108 is orthogonal to that the upper polarizer 116 axis.

In the parallax barriers shown in FIGS. 5A and 5B, light 108a is linearly polarized by the lower polarizer 108 and then passes through the second regions "K" and is twisted at 90 degrees so that the light transmitted through the second regions "K" can pass the upper polarizer 116. The linearly polarized light 108a passing through the first regions "J" does not pass the upper polarizer 116 because the linearly polarized light 108a passing through the first regions "J" is not twisted 90 degrees. Therefore, the upper polarizer 116 prevents the light transmitted though the first regions "J" from being emitted and allows the light transmitted through the second regions "K" to pass through. As a result, the second regions "K" act as slits in the parallax barrier.

The liquid crystals in the liquid crystal polymer 112 have both e-mode (extraordinary mode) and o-mode (ordinary mode). In e-mode the liquid crystal molecules are arranged parallel with the optic axis of the polarizer. In o-mode the liquid crystal molecules are arranged perpendicular to the optic axis of the polarizer. Thus, although the liquid crystal molecules are inversely arranged in the second regions "K" of FIG. 5A and that of FIG. 5B, the polarization of the light 108a is the same in FIGS. 5A and 5B.

In the parallax barrier shown in FIGS. 5A and 5B, the width of the first regions "J" is approximately twice as large than that of the second regions "K". This allows the second regions "K" to act as parallax barrier slits. Accordingly, the observer's left and right eyes will see the images intended for them across the display, thereby allowing the observer to perceive the 3-D effect.

Figure 6A:
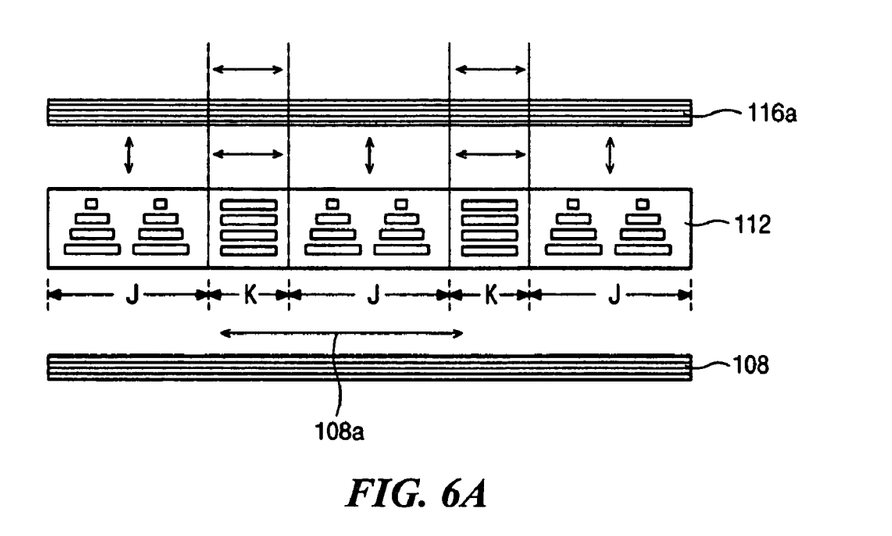
Figure 6B:
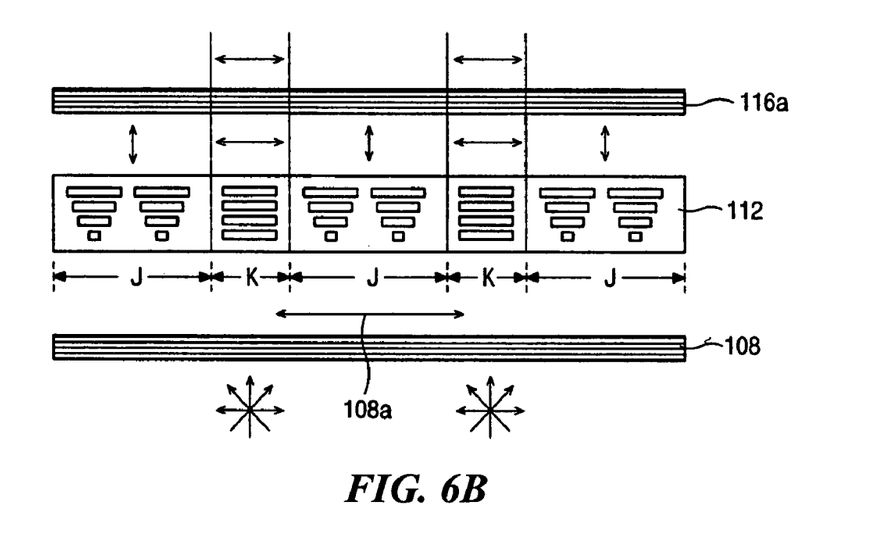

The parallax barrier shown in FIGS. 6A and 6B differs from that shown in FIGS. 5A and 5B. Referring to FIGS. 6A and 6B the liquid crystal molecules in the first regions "J" are twisted at 90 degrees, and the liquid crystal molecules in the second regions "K" are horizontally arranged. Furthermore, an upper polarizer 116a has a similar optic axis to that of the lower polarizer 108. The optic axis of the upper polarizer 116a is parallel to the axis of the lower polarizer 108.

Since the liquid crystal molecules in the second region "K" are parallel with the optic axes of the lower and upper polarizers 118 and 116a, the linearly polarized light 108a passes through the second region "K" without any polarization and also passes through the upper polarizer 116a. Furthermore, since the linearly polarized light 108a is twisted after passing through the first regions "J" this light is not emitted through the upper polarizer 116a. As mentioned before, the arrangement of the liquid crystal molecules in the first regions "J" of FIG. 6B are symmetric up and down.

The liquid crystal polymer including the chiral dopant as explained above can be used not only in the above-mentioned parallax barrier, but also in a beam-splitter for displaying 3-D images. For example, the 3-D system display apparatus includes a light source, a display panel and a beam-splitter. In this display apparatus adopting the beam-splitter the light from the light source is split into two light beams, which are respectively directed to the left and right eyes of an observer. The light beams respectively pass through beam splitters. Thus, a different image corresponding to the left and right eye is encoded onto each polarized beam so as to create a 3D image that can be viewed by the observer.

Figure 7:
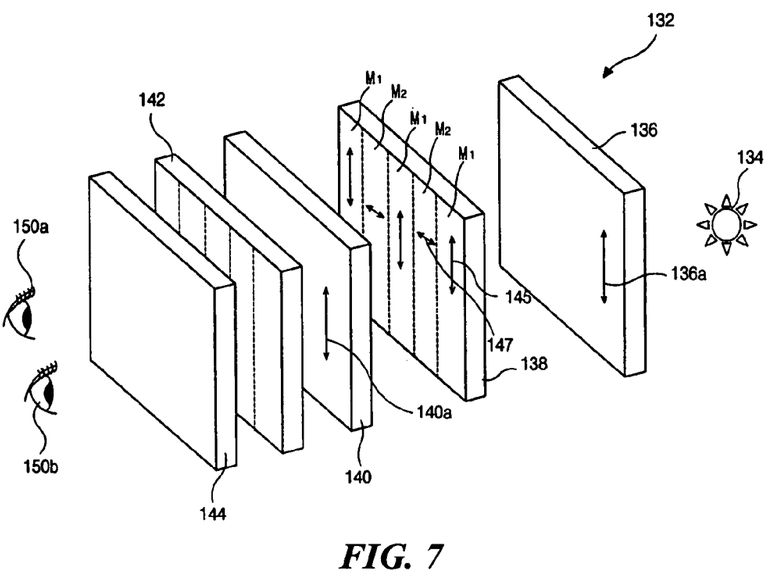
FIGS. 7 and 8 are global views illustrating a 3-D display apparatus with a beam-splitter according to the present invention.
Figure 8:
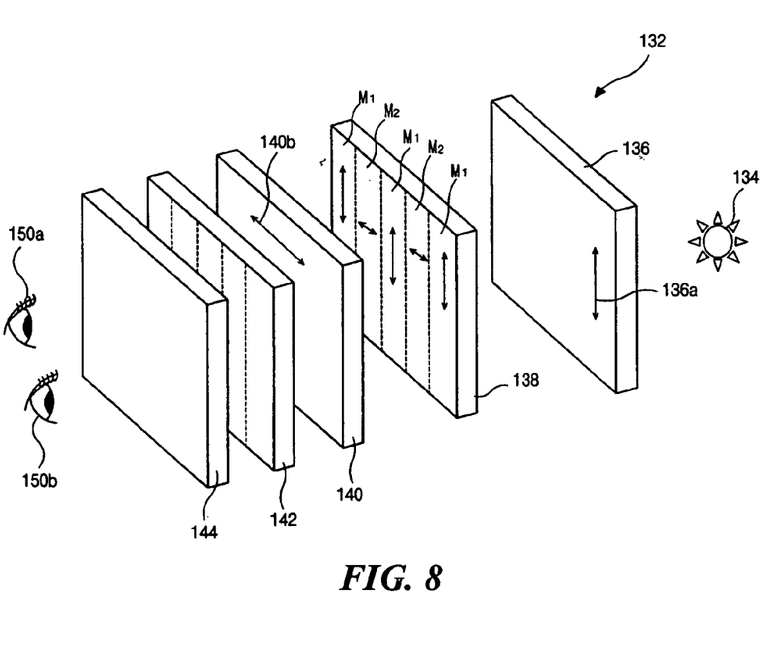

FIGS. 7 and 8 are global views illustrating a 3-D display apparatus with a beam-splitter according to the present invention. A beam-splitter 138 shown in FIGS. 7 and 8 is made of the same material and by the same method as the liquid crystal polymer 112 explained in FIGS. 4A and 4D above.

Referring to FIG. 7 the 3-D display apparatus 132 adopting the beam-splitter 138 includes a light source 134, a first polarizer 136, a second polarizer 140, a liquid crystal panel 142 and analyzer 144. The first polarizer 136 is on the rear surface of the beam-splitter 138, and the second polarizer 140 is on the front surface of the beam-splitter 138. The beam-splitter 138 is divided into a plurality of first "M1" regions and a plurality of second "M2" regions. Both of these regions are in the elongated strip shapes. The liquid crystal panel 142 is on the second polarizer 140, and the analyzer 144 is then on the liquid crystal panel 142. The first polarizer 136 has an optic axis 136a, which is parallel with the strip-shaped first and second "M1" and "M2" regions. The optic axes 145 of the first "M1" regions are parallel with the optic axis 136a of the first polarizer 136, while optic axes 147 of the second "M2" regions are perpendicular to the optic axis 136a of the first polarizer 136. The optic axis 140a of the second polarizer 140 and the optic axis 136a of the first polarizer 136 are parallel.

Within the 3-D display apparatus 132 as shown in FIG. 7, the first polarizer 136 polarizers light from the light source 134 at 90 degrees. The linearly polarized light passes through the first regions 145 without any polarization and then passes the second polarizer 140. However, the light polarized by the first polarizer 136 is polarized at 90 degrees to the optic axis 140a of the second polarizer 140, therefore, it does not passes through the second polarizer 140. As a result, the observer's left 150a and right 150b eyes only see the light transmitted through the first regions "M1" of the beam-splitter 138. Thereby, allowing the observer to perceive the 3-D effect through the liquid crystal panel 142.

In FIG. 8, the second polarizer 140 has an optic axis 140b that is parallel with the optic axes of the second regions "M2" and orthogonal to the optic axis 136a of the first polarizer 136. Thus, the observer's left 150a and right 150b eyes see light transmitted through the second regions "M2" of the beam-splitter 138.

According to the present invention, since the chiral dopant is included in the liquid crystal panel of the parallax barrier, the steps of fabricating the parallax barrier decreases considerably, thereby lowering the manufacturing cost. Furthermore, when the analyzer or the polarizer is removed from the liquid crystal panel, the observer can perceive the 2-D image instead of the 3-D image. Thus, the display apparatus of the present invention can be switchable between two-dimensional (2-D) and three-dimensional (3-D) displays.

It will be apparent to those skilled in the art that various modifications and variations can be made in the array substrate of the present invention without departing from the spirit or scope of the invention. Thus, it is intended that the present invention cover the modifications and variations of this invention provided they come within the scope of the appended claims and their equivalents.

What is claimed is:

1. A method of forming a liquid crystal polymer for use in a parallax barrier and a beam-splitter, comprising;
    forming liquid crystals including chiral dopant on a substrate;
    dividing the substrate into first regions and second regions;
    aligning a mask having light-transmitting portions that corresponds to the first regions and light-shielding portions that corresponds to the second portions;
    photoirradiating the liquid crystals including the chiral dopant so as to make the first regions have a first optic axis and to make the second regions have a second optic axis; and
    forming a polarizer on the liquid crystals.

2. The method according to claim 1, wherein the first optic axis is parallel to a polarizing axis of the polarizer.

3. The method according to claim 1, wherein the second optic axis is at 90 degrees to the polarizing axis of the polarizer.

* * * * *